Dec. 15, 1964   C. J. SIEBERT ET AL   3,161,132
EPOXY RESIN STRUCTURAL FILLER MATERIALS
Filed Jan. 16, 1963

INVENTORS
Cletus J. Siebert
Wilfred G. Burgan, Jr.
BY Claude Funkhouser
ATTORNEY
Kenneth E. Preston Jr.
AGENT

United States Patent Office 3,161,132
Patented Dec. 15, 1964

3,161,132
EPOXY RESIN STRUCTURAL FILLER MATERIALS
Cletus J. Siebert, Winter Park, and Wilfred G. Burgan, Jr., Maitland, Fla., assignors, by mesne assignments, to the United States of America as represented by the Secretary of the Navy
Filed Jan. 16, 1963, Ser. No. 251,993
1 Claim. (Cl. 102—49)

This invention pertains generally to supporting structure for an irregularly shaped mass which is to be constrained against movement with respect to a containing housing therefor. More particularly it relates to instrumentalities for providing support for a warhead within a missile envelope as well as providing structural integrity and interrelationships between the warhead and envelope such that flight loads may be transferred directly from the envelope to the warhead.

Guided missiles of the variety which are adapted for launching from an aircraft in flight are commonly secured to the aircraft at points along the external surface of the craft. The attachment instrumentalities used to secure the missile to the aircraft may comprise one or more lugs on the missile skin which are releasably retained by suitable latches, rails, holders and the like on the aircraft skin.

While attached to the aircraft, the missile is often subjected to shocks, vibrations and loads due to air resistance, centrifugal and centripetal forces and resultant components thereof. These forces are concentrated on the missile skin areas at which the lugs are attached. In the past the local areas on the missile skin, at which the supporting lugs were attached, were required to be of sufficient strength to support the missile when the aforementioned forces and stresses were imposed thereon. This necessitated the use of bands of structural material or "hard points" of adscititious supporting structure to provide the proper surface strength. Additionally, the stresses imposed upon the launcher lugs were reflected generally radially inwardly thereby imposing concentrations of stress upon the components within the missile proximate thereto. It was also important to provide shock absorbing instrumentalities to protect the components housed within the missile, as well as providing stiffening members longitudinally of the missile to carry the inherent bending stresses imposed on the missile due to the spaced relationship of the lugs.

It is therefore desirable to transfer the loads and stresses imposed on the missile from the locations at which launching lugs are secured, as well as from those points along the missile body at which forces and stresses are concentrated during flight after launching, uniformly throughout the missile. It is particularly desirable that structural changes in the missile should result in a reduction in weight and simplicity in overall manufacture and use.

The present invention contemplates the utilization of missile payload components as structural members within the missile casing, thereby providing the missile with the required structural integrity while effecting a reduction in missile skin thickness and associated structural components. More specifically the invention comprehends coupling the missile warhead, or other components, to the missile skin by means of an epoxy resin filler.

It is therefor an object of the present invention to provide for the transfer of free flight loads and captive flight loads, which are imposed on the missile skin, directly into the warhead or other payload components and, additionally, to accomplish the load transfer utilizing minimum space requirements.

It is another object of the present invention to utilize the necessary missile components as structural members within the missile thereby promoting structural integrity throughout the missile.

A further object is the provision of an improved missile structure which eliminates manufacturing difficulties due to tolerance buildup, and permits very wide tolerance ranges to be used on the component sub-structures.

Another object of the present invention is to provide missile structural arrangements wherein the maximum size warhead may be used with a minimum size missile envelope or casing.

A further object of the present invention is to provide for the ilimination of detail structural parts thereby effecting manufacturing economies.

Another object of the present invention is the provision for a reduction in total missile weight either by eliminating metal structure or by replacing metal structure with suitable lighter weight material.

A further object of the present invention is the provision for the different coefficients of expansion and contraction of the missile skin missile component and the metal structure replacement material thereby permitting expansion and contraction of the aforementioned elements without damage thereto.

Another object of this invention resides in the linking of missile components to the missile skin and, specifically, the coupling of the warhead to the missile skin thereby utilizing the warhead as a structural component of the missile whereby the warhead assumes the loads and stresses transferred inwardly thereto from the missile surfaces.

Other objects and many of the attendant advantages of this invention will be readily appreciated as the same becomes better understood by reference to the following detailed description when considered in connection with the accompanying drawings wherein.

Figure 1:
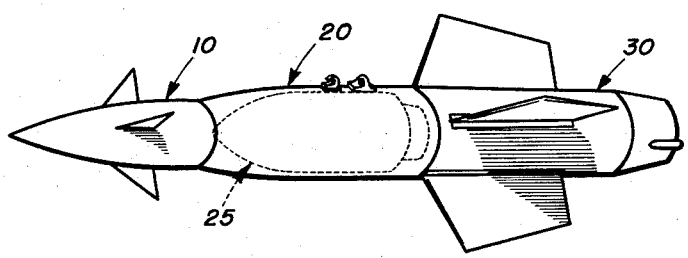
FIG. 1 is a perspective view of a missile showing the forward guidance section, the center warhead or payload section with a warhead indicated in dotted lines, the missile handling and launching lugs mounted on the skin surface thereof and the aft propulsion section.
Figure 2:
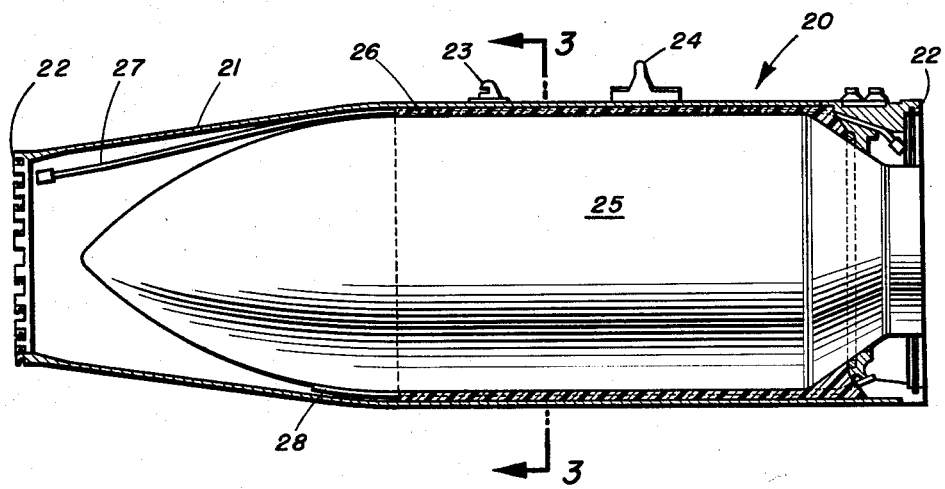
FIG. 2 is an enlarged vertical sectional view, with parts broken away, of the missile warhead section showing a preferred embodiment of the invention.
Figure 3:
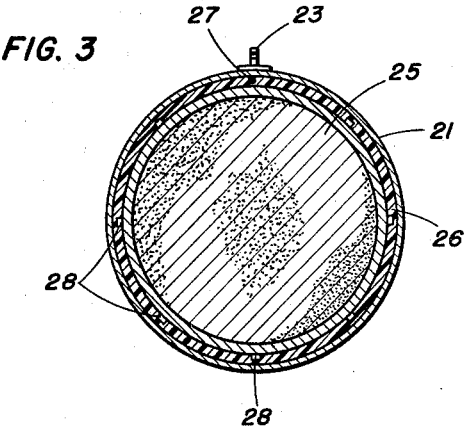
FIG. 3 is a transverse sectional view of a portion of the missile warhead section and the instant invention therein taken substantially along the lines 3—3 of FIG. 2.

Referring now to the drawings there is shown a missile having a forward guidance section 10, an intermediate payload section 20 and an aft propulsion section 30 replaceably interconnected to form a unified launchable unit. The center payload section, as shown in FIG. 2, comprises an outer casing or missile skin 21 having a generally cylindrical configuration and terminating at either end in flanges, holes or other suitable instrumentalities for attachment to the forward and aft missile sections. Appropriate lanuching and handling lugs, 23 and 24, are secured to the casing for releasably attaching the missile to an airplane or other desired launching devices.

Carried within casing 21 is a warhead or bomb component 25. Obviously the payload could be selected from a variety of components other than warheads, such as military or scientific data accumulating equipment.

In order to alleviate the requirement of structural reinforcement for a casing 21 and to provide sufficient strength to support the payload contained therein, the present invention incorporates a novel structural association of the payload to the missile casing. The relationship is such that flight loads and captive flight loads are transferred directly into the payload thereby creating structural integrity between the missile casing and the components therein. The instant invention accomplishes this association of elements by filling the void or space, or portions thereof, between the payload and casing with an epoxy resin filler 26. Placement of the epoxy filler material between the payload and casing is achieved by mixing epoxy resin and hardener in desired proportions and at proper temperatures, and injecting said mixture into the cavity preselected for filling. The injection may be completed under pressure, if necessary, through suitable holes, conduits and the like as may be required to facilitate proper filling and subsequent hardening of the epoxy. The casing and payload components may be either heated or cooled to those temperatures most advantageous to the molding process.

Tunnels for wiring, conduits, access holes and the like may be molded in, where necessary, when the epoxy is poured. This process eliminates the requirement for additional detailed parts. The problem of the high coefficient of expansion of the epoxy, which is sandwiched between the metal and warhead structures having lower coefficients of expansion, is eliminated by providing expansion strips 28 of rubber or other suitable material longitudinally in the epoxy. In addition, the casing and internal components may be covered with suitable material such as silicone grease to prevent bonding of the epoxy to the metal parts. This method of construction allows the epoxy to expand and contract within the confines of the metal structure.

A substantial cost reduction is realized in the overall structure due to the elimination of a multiplicity of structural detail parts and the ability to adapt to a wide range of tolerances. In addition, the use of the epoxy filler eliminates many manufacturing difficulties such for example as problems of interchangeability of components due to tolerance buildup effects. It also permits very wide tolerance ranges to be used on the sub-structures or payload. Furthermore, this design permits the use of a maximum size warhead or other payload within any given casing, as well as smaller warheads, as may be desirable. The overall missile weight may be held to a minimum since the epoxy filler has a weight less than the metal structure which it replaces. As may be understood all cavities within the missile casing need not be filled with epoxy filler, the volume to be filled being selected to achieve satisfactory load and stress transfer while maintaining the amount of epoxy filler at a minimum.

Obviously many modifications and variations are possible in the light of the above teachings. It is therefore to be understood that, within the scope of the appended claim, the invention may be practiced otherwise than as specifically described.

What is claimed is:

In a missile adapted to be transported and launched from an external location on an aircraft and having a forward guidance section, an intermediate warhead section and an aft propulsion section, the improvement in said intermediate section comprising, a generally cylindrical outer casing adapted at one end to be attached to said forward section and at the opposite end to be attached to said aft section, lugs secured to said casing for attachment to a launcher or other handling instrumentality whereby said missile may be supported thereby, said casing being characterized by a thickness of such dimension as to be incapable of withstanding the concentrations of stress, shock and bending moments imposed thereon by said lugs in response to air resistance, centrifugal and centripetal forces and resultant components thereof, a warhead positioned within said casing for transportation to a target by said missile, and an epoxy resin high-strength structural material filling portions of the remaining volume within said casing and extending between and in contact with said casing and warhead thereby effectively coupling the casing, epoxy structural material and warhead into a structurally integrated unit for transferring loads and stresses imposed upon said casing by said lugs through said structural material into said warhead whereby said warhead is effectively a structural member strengthening said casing thus permitting a reduction in the required strength and thickness of said casing.

References Cited by the Examiner

UNITED STATES PATENTS

| | | | |
|---|---|---|---|
| 2,835,107 | 5/58 | Ward | 102—49 XR |
| 2,937,597 | 5/60 | Winn et al. | 102—92.5 |
| 2,948,126 | 8/60 | Woodward | 102—92.5 XR |
| 2,968,244 | 1/61 | Maas et al. | 102—49 |
| 3,026,772 | 3/62 | Moreland | 89—1.5 |
| 3,099,959 | 8/63 | Bowersett | 102—49 |

FOREIGN PATENTS

| | | |
|---|---|---|
| 1,242,187 | 8/60 | France. |

SAMUEL FEINBERG, *Primary Examiner.*